Figure 1:
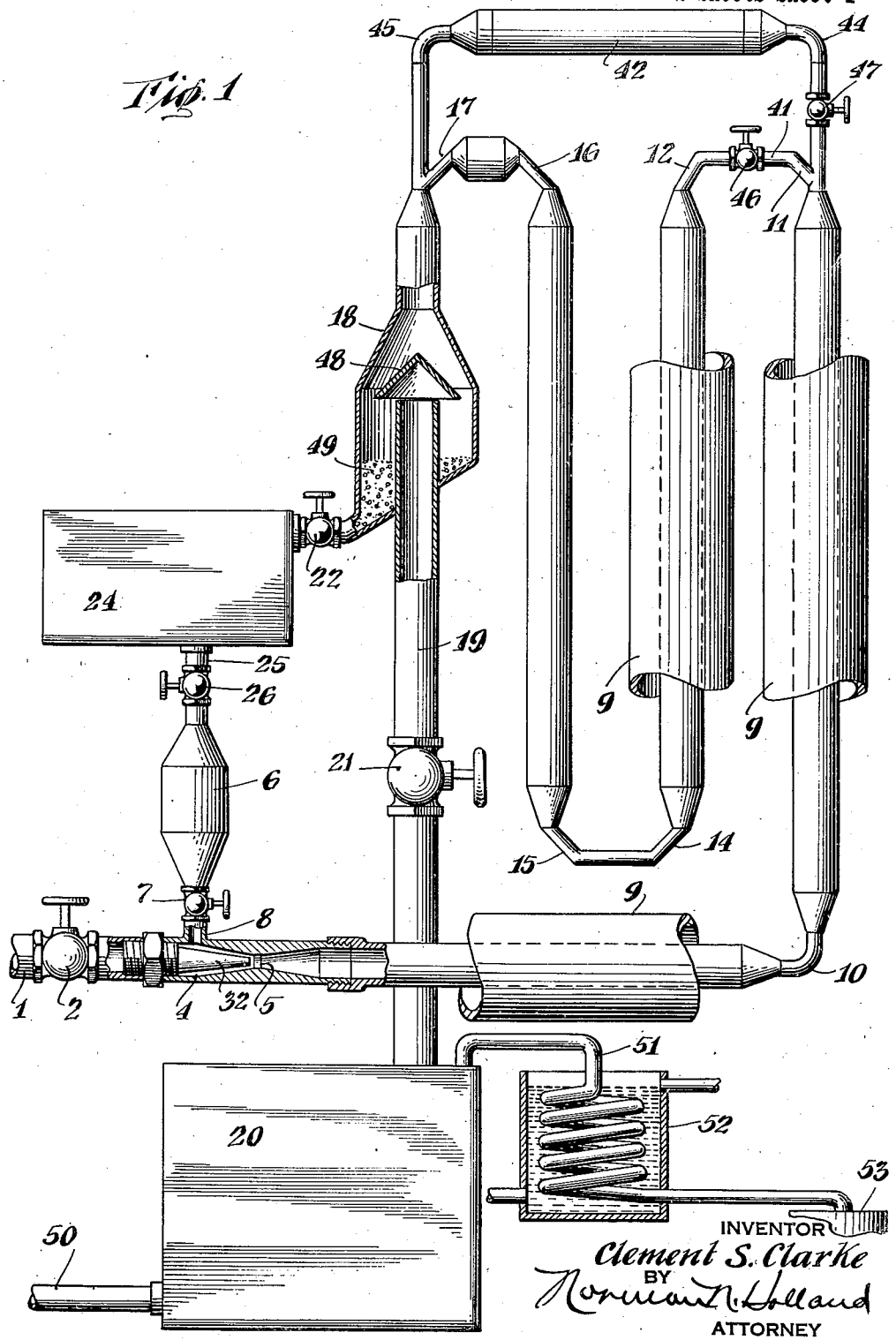

Aug. 10, 1943.   C. S. CLARKE   2,326,438
METHOD OF TREATING HYDROCARBONS
Filed Dec. 20, 1940   2 Sheets-Sheet 1

Aug. 10, 1943.   C. S. CLARKE   2,326,438
METHOD OF TREATING HYDROCARBONS
Filed Dec. 20, 1940   2 Sheets-Sheet 2

INVENTOR
Clement S. Clarke
BY
Norman L. Holland
ATTORNEY

UNITED STATES PATENT OFFICE 2,326,438

METHOD OF TREATING HYDROCARBONS

Clement S. Clarke, Shreveport, La.

Application December 20, 1940, Serial No. 370,935

1 Claim. (Cl. 196—52)

The present invention relates to the chemical treatment of fluids, and more particularly to a method of treating hydrocarbons.

A serious problem in refining crude oil and other hydrocarbon products is the numerous hydrocarbon compounds that may be made therefrom. The refiner is confronted not only with the problem of forming the desired compounds, but also with the problem of retaining them in stable form and of separating them from the residue. Gasolines have been formed by distillation processes, which are generally termed straight-run gasolines, and have also been formed by thermal-cracking processes. Both of these methods require excessive heat and thermal-cracking requires, in addition, excessive pressure. The affinity between the separated hydrocarbon molecules, which is increased by heat and pressure, makes it difficult to separate out the desired hydrocarbons from the oil when using these old processes. That is, when the refiner attempts to break up the heavier molecules into lighter end products such as gasoline, the degrees of the heat and pressure required, cause some of the lighter ends formed to recombine into the heavy molecule products such as fuel oil and asphalt. Hydrogenation has been tried in attempting to overcome this difficulty, but it is too expensive to be adapted for general commercial use.

By using one or more suitable catalysts in a catalytic process of oil refining relatively low temperatures and low pressures may be utilized. With such catalytic processes, temperatures of about 900 degrees and pressure of from twenty to forty pounds per square inch may be utilized. In the old method of thermal-cracking, pressures ranging from 200 to 3,000 pounds per square inch were required. In addition, gasolines produced by catalytic refining processes are more desirable for commercial purposes as they have a higher octane rating and are a higher grade. This is true even though the poorest types of crude oil are utilized. Thus very small amounts of tetraethyl lead, or none at all, need be added to obtain maximum efficiency in high compression engines.

One difficulty in utilizing a catalytic refining process is to obtain a homogeneous mixture so that all particles of the crude oil will contact with the catalyst. In addition, the catalyst quickly becomes "poisoned" and ineffective because of contamination with sulphur and carbon and it can no longer be used. The particular catalytic cracking tower in which the action has taken place must then be cut out of the system and the sulphur and carbon burned out of the catalyst to reactivate it.

The present invention aims to overcome or minimize the above and other difficulties in the use of a catalyst by thoroughly mixing the catalyst with the petroleum and other hydrocarbons to be treated, by maintaining a homogenized mixture for a predetermined period to obtain the proper chemical reaction, by separating the catalyst from the hydrocarbon, by reactivating the separated catalyst and by returning it to the system, thereby providing a continuous process of using a moving catalyst in a chemical treatment. The invention resides particularly in the improved method and means of achieving the results.

An object of the present invention is to provide an improved method and apparatus for refining hydrocarbons by means of a catalyst.

Another object of the invention is to provide an improved method and means for maintaining a homogenized mixture of a hydrocarbon with a catalyst.

Another object of the invention is to provide an improved method and means for maintaining a homogenized mixture of a catalyst and a hydrocarbon.

Another object of the invention is to provide an improved method and means of maintaining a homogenized solution of a fluid mixed with a catalyst having a different specific gravity.

Another object of the invention is to provide a continuous process in which a moving catalyst is introduced at the beginning of the process, is removed from the hydrocarbon after the desired chemical reaction, and is re-introduced either before or after it has been reactivated with the hydrocarbons to be treated, thereby providing a continuous process.

Another object of the invention is to provide an improved method and means of utilizing the energy of the moving hydrocarbon for mixing a catalyst with it.

Another object of the invention is to create a low pressure area within a closed system for refining hydrocarbons, whereby a catalyst may be introduced into the system at said low pressure area.

Other and further objects of the invention will be obvious upon an understanding of the illustrative embodiment about to be described, or will be indicated in the appended claims, and various advantages not referred to herein will occur to one skilled in the art upon employment of the invention in practice.

Figure 2:
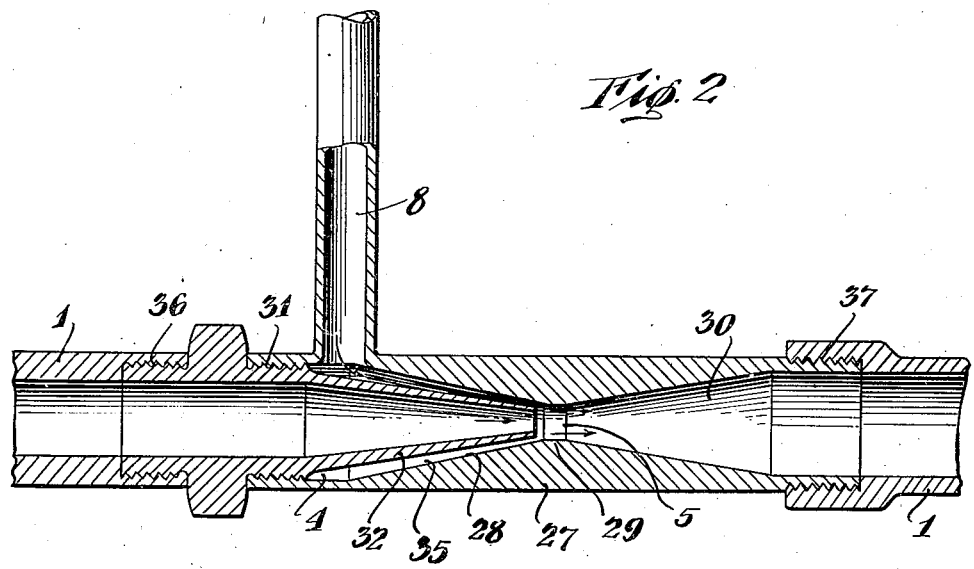
Figure 3:
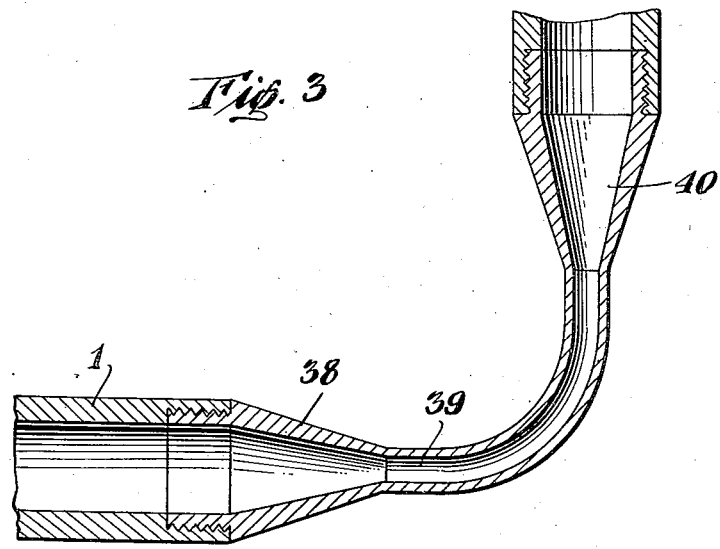

A preferred embodiment of the invention has been chosen for purposes of illustration and description and is shown in the accompanying drawings, forming a part of the specification, wherein Fig. 1 is a diagrammatic illustration of a method and apparatus for refining petroleum and other hydrocarbons embodying the present invention;

Fig. 2 is a sectional view through the venturi for introducing the mobile catalyst to the system; and Fig. 3 is a longitudinal sectional view through one of the piping bends to illustrate the details thereof.

The refining of hydrocarbons by catalytic processes may comprise, in general, passing the crude oil first through a primary fractionating tower to remove gasoline, kerosene and other lighter end products naturally present in the crude oil, and thereafter heating the relatively heavier residue under suitable pressure to the desired temperature, pumping the residue to a catalytic vaporizer to vaporize it, and bringing the vaporized residue into contact with the catalyst in a catalytic cracking tower or case. After passing through a heat exchanger the resulting product, which may be partly a gas, partly high grade gasoline, partly fuel oil and partly heavier residues, is pumped to a final fractionating tower to remove the gasoline from the heavier residue oils. The heavier residues may be passed through the system a second time for further catalytic refining to produce additional gasoline. The gasoline produced may be passed to suitable units for stabilizing it physically and chemically and finally to storage tanks.

The drawings of the present application are intended to illustrate diagrammatically in a general way one application of the present invention, it being understood that certain features thereof are applicable to the various types of refining processes and to various types of apparatus therefor wherein a moving catalyst is utilized.

Referring more particularly to the drawings, there is shown a pipe 1 having a valve 2 for furnishing a supply of hydrocarbons, preferably crude oil, for refining. Preferably the usual primary fractionating tower is used to remove the lighter end products naturally present in the crude oil. Any suitable means, such as a centrifugal pump, may be utilized for supplying the hydrocarbons under pressure to the pipe 1. A venturi 4 having a restricted throat 5 receives the hydrocarbons from the pipe 1 and increases the speed of the stream at the restricted throat of the venturi, which in turn decreases the pressure at that point. A hopper 6 having a metering valve 7 at its outlet is operatively connected by a conduit 8 to the throat of the venturi. The reduced pressure at the throat of the venturi, which is preferably less than the pressure of the system and which may be less than atmospheric pressure draws in a catalyst from the hopper 6 and thoroughly mixes it with the stream of hydrocarbons passing through the venturi. Various types of catalysts, either fluid or powdered solids, may be utilized. Since such catalysts are well known in the art, these are not enumerated herein. It has been found that the turbulence created by the high speed of the stream thoroughly mixes the crude oil or hydrocarbons with the catalyst. The pipe 1 continues on beyond the venturi and may be enclosed by a heat insulating casing 9. Suitable heating devices may be located within the casing to heat the hydrocarbons to the desired temperature or, if desired, the hydrocarbons may be pre-heated prior to reaching the Venturi tube. The heat insulating casing 9 is shown broken away to indicate that it may continue throughout the system or through such portions as need to be maintained at elevated temperatures. The mixed stream of catalyst and hydrocarbons or crude oil continues along pipe 1 through a series of bends 10, 11, 12, 14, 15, 16 and 17 to a separator 18 which separates the catalyst from the treated hydrocarbons. The treated hydrocarbons pass through pipe 19 and valve 21 to a reservoir or to suitable units 20 for physically and chemically stabilizing the gasoline produced. The gasoline and other hydrocarbons may be collected and delivered to proper storage tanks or the gasoline alone may be run to storage tanks and the heavier molecule products put through the circuit again for a second "pass." The separated catalyst is delivered through the valve 22 to a reactivating chamber or unit 24 where the sulphur and carbon are burned from the fouled catalyst by a blast of air so that it is in condition to be used again. Any suitable means may be utilized for this purpose. The reactivated catalyst is fed through pipe 25, valve 26 to the hopper 6.

The above description is general and a specific description of the parts and their operation will now be given without any intention of limiting the invention beyond its true and comprehensive scope.

The venturi 9 is shown in detail in Fig. 2 and comprises a pipe 27 having a reduced tapered portion 28 leading to a reduced throat 29 and thence expanding outwardly as shown at 30 to the normal size of the pipe 1. One end of the Venturi pipe is internally threaded at 31 to receive a threaded internal conical member 32 which tapers inwardly into a small nozzle terminating adjacent the throat 29 of the venturi. The outer surface of the tapered portion 32 is slightly smaller than the internal surface of the inwardly tapered throat 28 of the venturi, leaving between the two an annular space 35. The pipe conduit 8 leading from the hopper 6 containing the catalyst connects with the space 35 leading to the throat of the venturi. The opposite end of the conical member 32 is threaded at 36 to fit into the pipe 1 and the other end of the member 27 is threaded at 37 to fit into the pipe 1. It will be seen that the stream of hydrocarbons in passing through the venturi is greatly reduced in size, which necessitates a greatly increased speed and turbulence at the throat of the venturi. Likewise the pressure at the throat of the venturi becomes substantially less than that in the normal portions of the pipe 1 and of the system and may be below atmospheric pressure. In view of this the catalyst will be drawn in from the hopper 6 through the metering valve 7 and thoroughly mixed with the hydrocarbons flowing through the venturi. The amount of the catalyst delivered to the stream of hydrocarbons may be increased or decreased by changing the setting of the metering valve 7. Thus the hydrocarbons, thoroughly mixed with the catalyst, will pass along pipe 1 through the system. The casing 9, shown diagrammatically, may be constructed in any suitable manner and since the details of its construction form no part of the present invention, they are not included herein. The casing may extend sufficiently far and the interior may be properly heated to maintain the proper temperature about the pipe 1 for the necesary distance to insure the proper chemical and catalytic action. In some instances it may be desirable to heat the hydrocarbons prior to delivering to the present system, in which case less heat or no heat at all may be required in the casing 9. If desired, the hydrocarbons may be heated to a vaporous or a combined liquid and vaporous state and delivered to the system.

It has been found that the catalyst tends to separate from the hydrocarbon stream during its passage through the system. It has also been found that its tendency to separate is greatest at the pipe bends in the system. The present invention minimizes or overcomes this tendency by reducing the size of the pipe 1 at the bends, as shown more particularly in Fig. 3 which illustrates a preferred embodiment of the reduced portion. Referring to Fig. 3 the bend may be a separate pipe section threaded at each end for connection to the pipe 1 and may be reduced in size by a conical portion 38 which leads to a reduced part 39 extending about the bend and may terminate in an expanding portion 40 connected to the pipe 1. The increased turbulence occasioned by the reduced size of the bends tends to further mix the catalyst and the hydrocarbons and to prevent separation of the two. Preferably the reduced portion of a bend begins at a point prior to the change in direction of the flow of the fluid and extends to a point beyond the bend where the fluid is moving in its changed direction. It is believed that a catalyst having a different specific gravity than the hydrocarbons is acted upon centrifugally so that the heavier of the two is forced outwardly and the lighter of the two is forced inwardly in going around the bends so that the two tend to separate. By reducing the size of the conducting member at the bends the velocity of the mixture is increased around the bends. Where the reduced section of the conducting member is again increased in size great turbulence is set up at this point in the mixture being conducted, which turbulence is caused by a high velocity stream of mixture entering into a conducting member of greater area where part of the velocity is changed to pressure. This point of turbulence reforms the mixture into a homogeneous mass overcoming any separation that has taken place from centrifugal action around the bends.

While the preferred construction of the bend is shown at 10 and in Fig. 3, the side portions may be straight as shown at the bends 11, 12, 14, 15, 16 and 17. Where the pipe portion connecting two bends is relatively short, as shown between bends 11 and 12, between bends 14 and 15 and between bends 16 and 17, the intermediate portion 41 may be of reduced size as shown. In this way the hydrocarbons continue through the pipe 1 until they have been in contact with the catalyst sufficiently long to produce the desired chemical reaction, whereupon they are delivered to the separator 18 where the catalyst is separated from the hydrocarbons.

With different types of crude oil and other hydrocarbons, different periods, pressures and temperatures are required to obtain the proper chemical reaction. In order to use the same system for various types of crude oil one or more by-passes 42 may be provided with bends 44 and 45. A valve 46 in the main pipe 1 and a valve 47 in the by-pass may be operated either to shut off the by-pass by closing valve 47 and opening valve 46 or to by-pass the products by closing valve 46 and opening valve 47. In this way the time that the hydrocarbons are in contact with the movable catalyst may be varied as desired. Additional by-passes may be provided to give any variation required.

The separator 18, as diagrammatically illustrated herein, has a cone-shaped member 48 extending over the upper open end of a pipe 19. The catalyst generally being heavier than the hydrocarbon settles down as shown at 49 and the hydrocarbons flow upwardly over the end of the pipe 19 and are thus discharged for treatment or storage. While this simple type of separator is illustrated, it will be understood that any type of separator may be utilized, for example, a centrifugal separator. By opening the valve 22 the catalyst may be permitted to flow into the reactivating chamber 24 either by gravity which the level of the separator permits, as illustrated herein, or by a positive feeding device. The details of this chamber are not illustrated as various types of devices for burning out the carbon and sulphur from the catalyst may be utilized. Generally it is a matter of closing the valves 22 and 26, removing the gases, and blowing air through the "poisoned" catalyst. After the catalyst is reactivated, the valve 26 may be opened and the catalyst permitted to run into the hopper 6. From the hopper 6 the catalyst is fed through the venturi 4 back into the stream of hydrocarbons as described above. Thus the catalyst may be used repeatedly.

The overflow of the hydrocarbons from the separator 18 is delivered through pipe 19 and valve 22 into a reservoir 20. The liquid contents may settle at the bottom of the reservoir 20, and be delivered to stabilizing units, to a storage tank for heavier fuels or returned to the system through pipe 50 to be further treated. The vapors are delivered through pipe 51 into a condenser 52 and finally into a storage tank 53 for the proper grade of fuel desired.

It will be seen that the present system is continuous. The reduced pressure at the throat of the venturi 4 is utilized for drawing in the catalyst mixing it throughly with the hydrocarbons. The entire system may be under pressure including the hopper 6. The amount of the catalyst drawn in may be regulated by the valve 7. The period of time that the catalyst is in contact with the hydrocarbon may be regulated by suitable by-passes 42 so that the same system may be used for a series of grades of crude oil with equally good results. In addition, the use of a moving catalyst permits the catalyst to remain in contact with the hydrocarbon for a much longer period of time to assure the proper chemical reaction. The reactivating chamber burns out the sulphur and carbon from the catalyst without requiring separate catalytic chambers and without necessitating stoppage of the refining operations. The catalyst is thoroughly mixed with the hydrocarbons and the mixture is maintained in a homogenized state by reason of the reduced bends; thus complete reaction in a uniform and effective manner is assured.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

The method of treating fluid hydrocarbons, which method comprises flowing a stream of said fluid under pressure, reducing the size of the stream at a portion thereof to increase its velocity and turbulence, introducing a catalyst into and mixing it with said stream at said reduced portion in an annular zone surrounding said stream, said catalyst having a different specific gravity from said hydrocarbon, and maintaining said mixture in a substantially homogenized state by reducing the size of said stream at points where the direction of flow thereof is changed.

CLEMENT S. CLARKE.